United States Patent
Wu

(10) Patent No.: US 6,714,404 B1
(45) Date of Patent: Mar. 30, 2004

(54) STAND WITH INFRARED EMISSION

(75) Inventor: Jorson Wu, Hsin-Tien (TW)

(73) Assignee: Hann Hwa Industrial Co., Ltd., Hsin-Tien (TW)

( * ) Notice: Subject to any disclaimer, the term of this patent is extended or adjusted under 35 U.S.C. 154(b) by 0 days.

(21) Appl. No.: 10/295,968

(22) Filed: Nov. 15, 2002

(30) Foreign Application Priority Data

Oct. 9, 2002 (TW) .................................... 91216047 U

(51) Int. Cl.[7] ................................................ G06F 1/16
(52) U.S. Cl. ...................... 361/680; 345/168; 248/917; 312/208.1
(58) Field of Search ................... 361/679–687, 361/724–727; 345/168–172, 905; 235/145; 248/917; 400/489, 682, 691–693; 312/208.1, 208.4; 364/708.1

(56) References Cited

U.S. PATENT DOCUMENTS 6,317,313 B1 * 11/2001 Mosgrove et al. .......... 361/680
2002/0109961 A1 * 8/2002 Glad ......................... 361/680
2003/0021086 A1 * 1/2003 Landry et al. .............. 361/683
2003/0095380 A1 * 5/2003 Chen et al. ................. 361/686

* cited by examiner

*Primary Examiner*—Hung Van Duong
(74) *Attorney, Agent, or Firm*—Nelson A. Quintero

(57) ABSTRACT

A stand with infrared emission, which is connected to a related circuit of a keyboard, includes a pivot seat, a base, a support plate and a gyratory arm. The pivot seat is a joining part with an end thereof being connected to the keyboard and the other end thereof having a first pivot device. The base at the lower end thereof is connected to the pivot device. The support plate has the lower side thereof integrally connecting with the upper end of the base and the upper side thereof being provided with a connection part. The gyratory arm at the lower end thereof joining the connection part of the support plate and the upper end thereof is provided with an abrupt emission seat. An infrared emitter is disposed in the emission seat and electrically connected to the keyboard. A personal digital assistant (PDA) can be placed on both the base and the support plate with the gyratory arm being adjustably rotated such that the emission seat can align with an infrared receiver so as to facilitate data transmission.

20 Claims, 5 Drawing Sheets

STAND WITH INFRARED EMISSION

BACKGROUND OF THE INVENTION

1. Field of the Invention

The present invention relates to a stand with infrared emission, and particularly to a stand for placing a personal digital assistant (PDA), with which a gyratory arm can be rotated adjustably to allow an infrared emitting device aligning with an infrared receiver of the PDA for facilitating data receipt.

2. Description of Related Art

Due to the development of technology changing rapidly, our lives become getting more complicated than before. A matter in a company such as making sure the time of a conference, a briefing, arranging the visit time of client and etc. and a personal business such as a birthday of a family member, an anniversary and etc., which includes routine works and accidental events, have regulated our daily life schedule. In order to record the preceding schedules or dates, a conventional way frequently used is recorded in a memorandum book as a handy reminder. However, it is often careless to make a record in the memorandum book.

Taking the advantage of electronic technology developing rigorously, a so-called personal digital assistant (abbreviated as PDA hereinafter) is rose at the right time. The PDA, which is a light and small electronic device, has been developed to provide a function of multimedia recently.

According to two primary operation systems, Plam OS and Pocket PC, in the field of PDA, handwriting is used as data input and the input data is treated by recognition software before being stored in the memory. Owing to the speed of handwriting being much slower than keyboard input, it is the reason why the handwriting mode is undesirable by the user. Therefore, the manufactures have developed a keyboard especially for the PDA and the specifically designed keyboard has taken the advantage of the PDA with the Plam OS or the Pocket PC operation system having the infrared (IR) being used as a transmission device. Hence, an infrared emitting device is provided next to the keyboard to send signals out while the keyboard is operated and a infrared receiver built in the PDA can receive the signals instead of the inconvenient handwriting mode.

But, the deficiency of the keyboard with an infrared emitting device is in that the infrared receivers mounted in different brand PDAs are disposed at inconsistent locations on the outer casing thereof such as the left lateral wall, the right lateral wall or the top thereof. In order to perform the signal transmission, the emitting device has to be disposed. corresponding to the receiver and the display screen is placed toward a lateral side or even inversely placed. The preceding situations result in the input characters or symbols becoming laterally or inversely oriented such that it is hard to be sighted with eyes. A basic problem of the preceding deficiency is the conventional infrared emitting device being stationary so that it is unable to comply with different positioned infrared receivers on the PDA.

SUMMARY OF THE INVENTION

The crux of the present invention resides in that a stand with infrared emission, which is connected to a related circuit of a keyboard, includes a pivot seat, a base, a support plate and a gyratory arm. The pivot seat is a joining part with an end thereof being connected to the keyboard and the other end thereof having a first pivot device. The base at the lower end thereof is connected to the pivot device. The support plate has the lower side thereof integrally connecting with the upper end of the base and the upper side thereof being provided with a connection part. The gyratory arm at the lower end thereof joining the connection part of the support plate and the upper end thereof is provided with an abrupt emission seat. An infrared emitter is disposed in the emission seat and electrically connected to the keyboard. A PDA can be placed on both the base and the support plate with the gyratory arm being adjustably rotated such that the emission seat can align with an infrared receiver so as to facilitate data transmission.

BRIEF DESCRIPTION OF THE DRAWINGS

The present invention can be more fully understood by reference to the following description and accompanying drawings, in which:

FIG. 5 is a perspective view illustrating the stand shown in FIG. 4 in a state of being taken-in.

DETAILED DESCRIPTION OF THE PREFERRED EMBODIMENT

Figure 1:
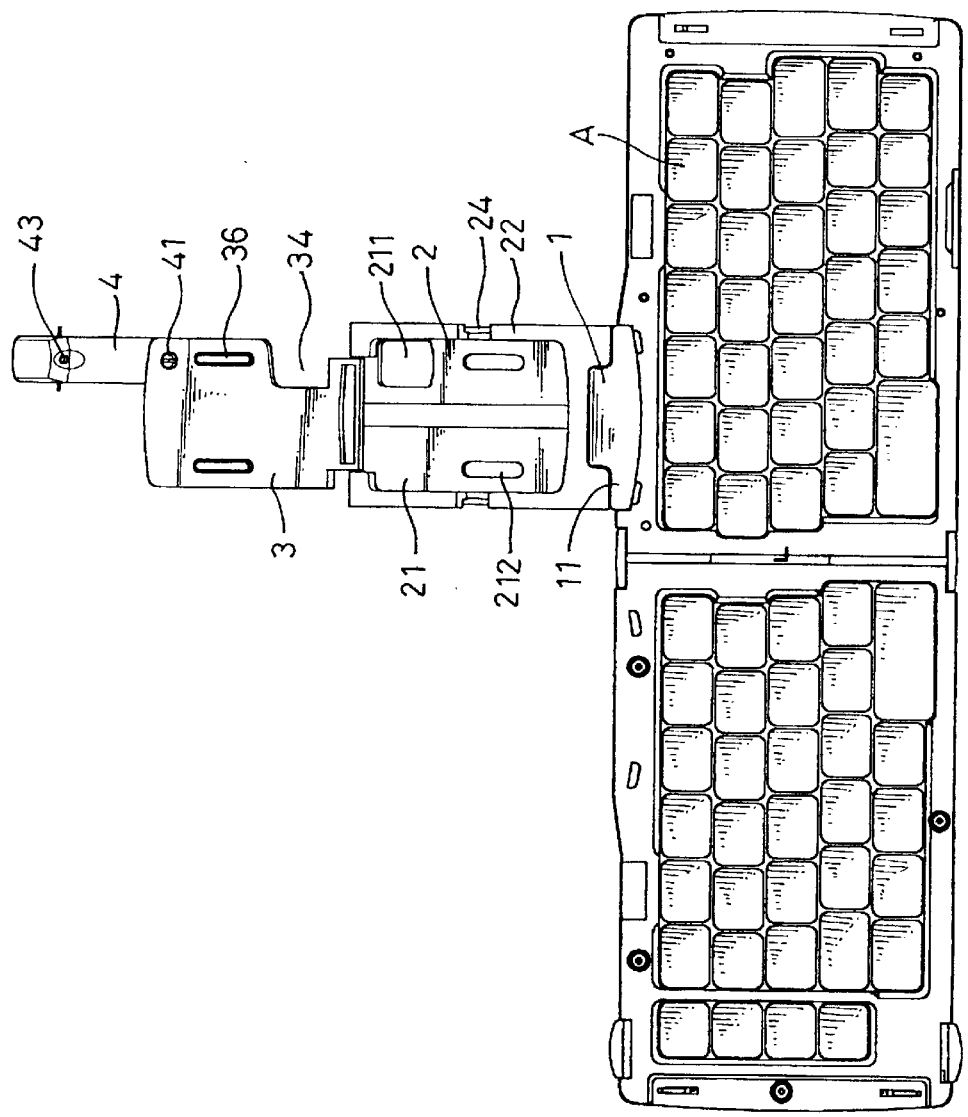
FIG. 1 is a plan view of a stand with infrared emission according to the present invention associated with a keyboard.
Figure 2:
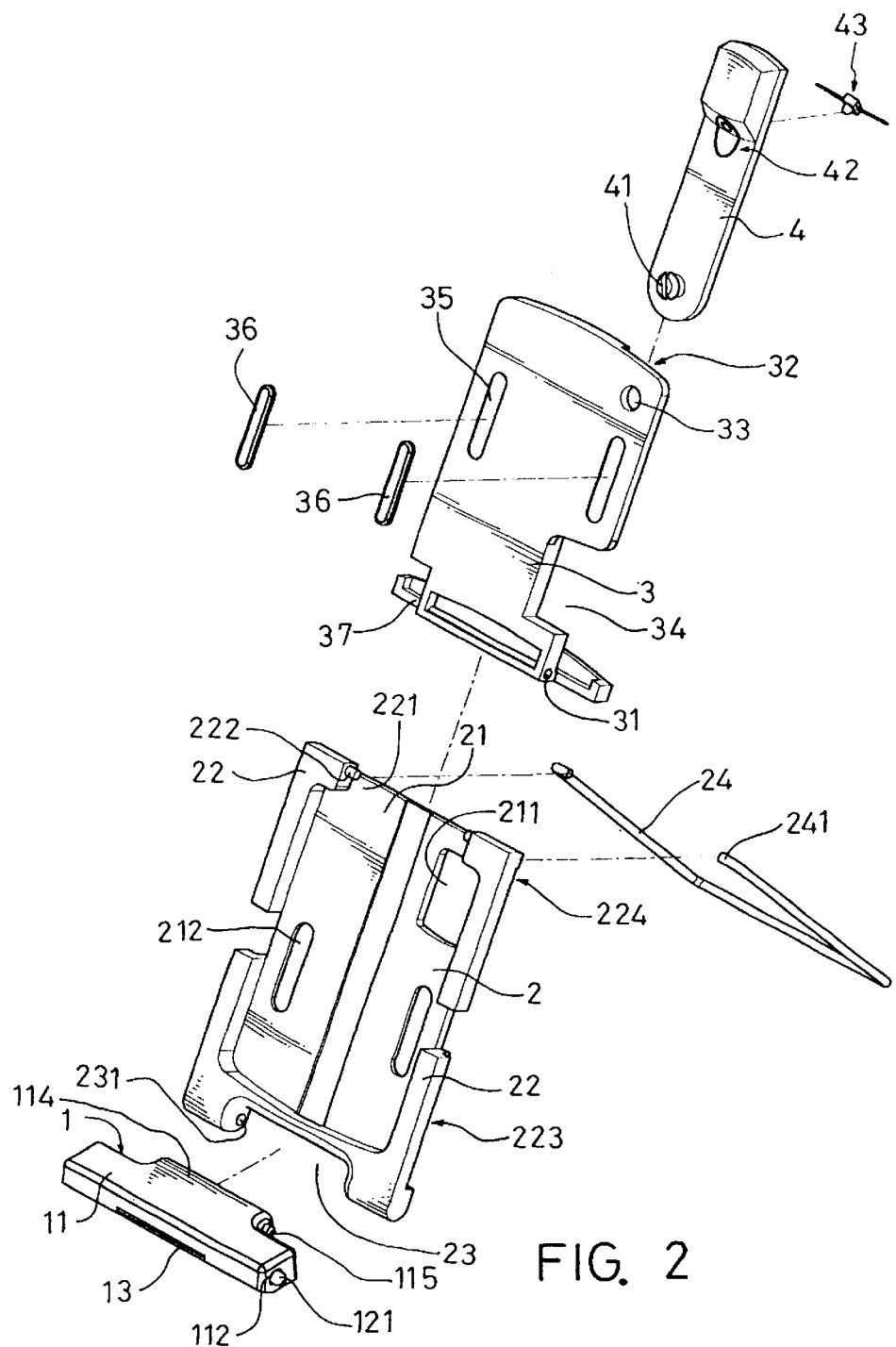
FIG. 2 is an exploded perspective view of the stand shown in FIG. 1.
Figure 3:
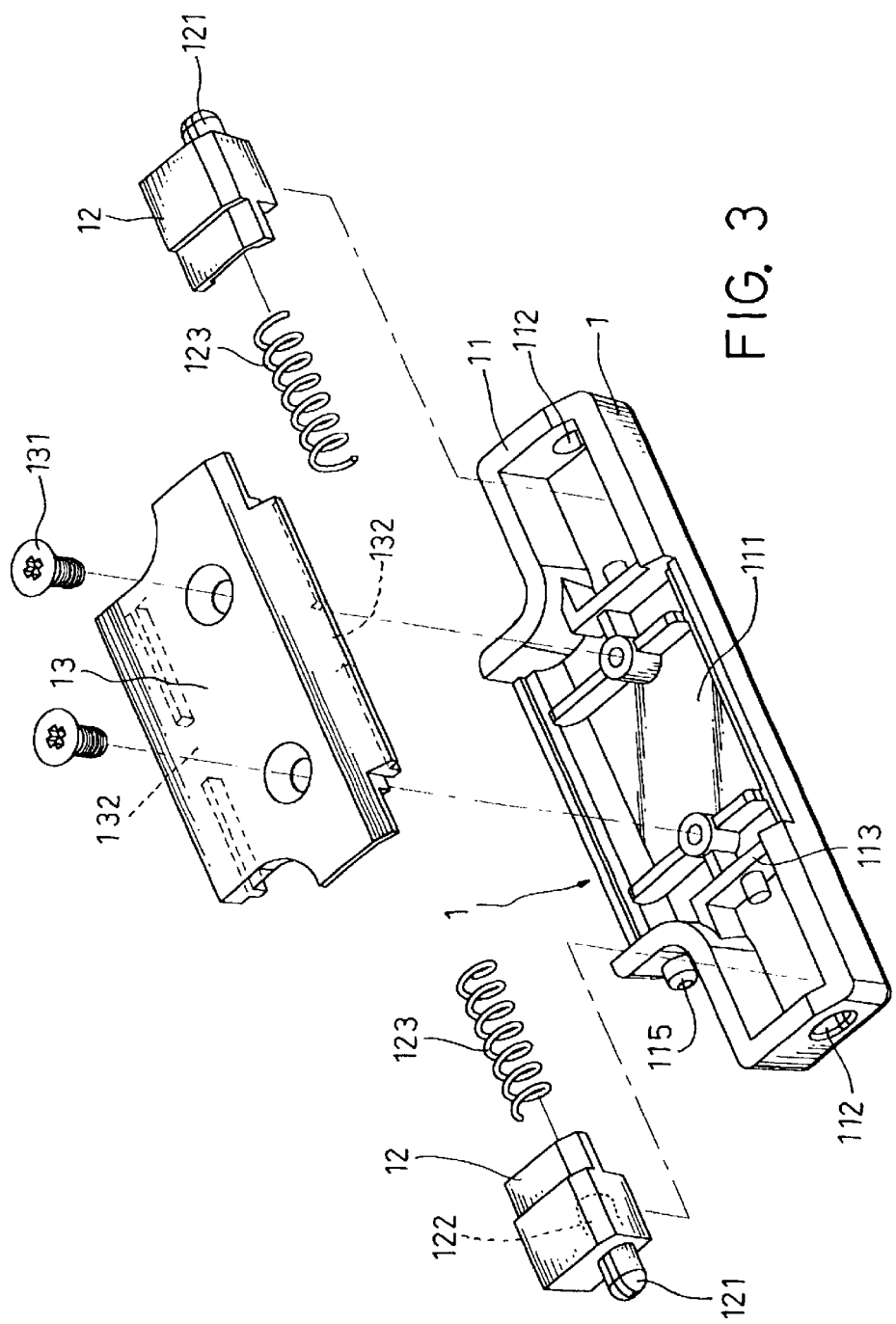
FIG. 3 is an exploded perspective view of a pivot base of the stand shown in FIGS. 1 and 2.

Referring to FIGS. 1 to 3, a stand with infrared emission according to the present invention is disposed in front of a keyboard A and basically includes a pivot seat 1, a base 2, a support plate 3 and a gyratory arm 4.

Wherein, the pivot seat 1 has a seat casing 11 inserted into a preset track in front of the keyboard so as to move forward and backward such that the seat casing 11 at both ends thereof extends a retractable shaft 121 respectively to engage with a conventional locating device at both ends of the preset track. Each of the retractable shafts 121 is disposed at the outer side of a fitting head 12 respectively and the fitting head 12 at the inner side thereof has a locating jut 122 attached with a spring 123. The seat casing 11 further has a seat chamber 111 and two opposite lateral casing holes 112 so that the two fitting heads 12 are placed at both lateral sides of the seat chamber 111 with the respective retractable shafts 121 extending outward through the casing holes 112. Each of the two springs 123 presses against a respective preset stop rib 113 in the seat chamber 111 so that the fitting heads 12 can displace laterally and the retractable shafts 121 can stretch and retract via the casing holes 112. Besides, a cover 13 is used to close the bottom of the seat chamber 111 and fastened to the seat casing 11 with screws 131 such that the fitting heads 12 are not possible to become loose apart. Signal lines can be arranged to pass through a wire passage 132 at the inner side of the cover 13 so as to connect with an infrared emitter 43 disposed at the gyratory arm 4. Further, in order to be connected to the base 2, the seat casing at the front side thereof extends a casing step 114 with both lateral ends thereof extending a pivot 115 respectively.

The base 2 has a shape of rectangle with a base plate 21 thereof having two opposite edge projections 22 at two lower and upper lateral sides thereof. A locating recess 23 and two opposite fitting holes 231 are disposed between the edge projections 22 corresponding to the casing step 114 and the two pivots 115 respectively so that the base 2 can pivotally join with the seat casing 11 such that the base 2 can rotate with respect to the pivot seat 1. An opening 221 is formed between the two abrupt edge portions 22 at the upper lateral sides with an axle 222 extending toward the opening 221 from the two upper edge projections 22 respectively so as to connect with the support plate 3 axially. Besides, all the abrupt edge projections 22 at bottoms thereof have a frame groove 223 respectively along the lateral sides thereof and the upper edge projections 22 at tops thereof have a pivot hole 224 respectively such that a U shaped frame 24 can be inset to the frame grooves 223 with two opposite bent ends 241 of the frame 24 being inserted into the frame holes 224. The frame grooves 223 are attached with an engaging extension 225 respectively for retaining the frame 24 in the frame grooves 223. When the frame 24 is released from the engaging extensions 225 in the frame grooves 223 and turned outward, the entire base 2 can be held with the frame 24 with a PDA on the base 2. Moreover, the base plate 21 at the upper portion thereof has a receiving hole 211 and at the middle portion thereof has two opposite elongated recesses 212 for receiving and locating an emission seat 42 of the gyratory arm 4 and two anti-slip pad 36 attached to the support plate 3 respectively.

The support plate 3 at the lower side thereof with two opposite lateral joining holes 31 corresponds to the opening 221 such that the axles 222 on the upper edge projections 222 can fit with the joining holes 31 and the support plate 3 can be turned over with respect to the base 2 pivotally so as to be lap in the base 2. The support plate 3 at the upper corner thereof has a lower plate recess 32 and a locating hole 33 and at the lower portion thereof has a hollow-out 34 corresponding to the emission seat 42 of the gyratory arm 4 for receiving the emission seat 42 while the gyratory arm 4 is taken in. Besides, the facial side of the support plate 3 has two opposite elongated nests 35 corresponding to the two elongated pad recesses 212 for locating the two anti-slip pads 36 so that it is not possible for the PDA to slip during being placed on the support plate 3. Further, the support plate at the lower side thereof has a rear baffle 37 against the back side of the base 2 at the top edge thereof such that the support plate 3 can be retained and define the maximum opening angle.

The gyratory arm 4 is a lever with a protrusion 41 at the lower end thereof to fit with the locating hole 33 so that the gyratory arm 4 can be rotated with respect to the support plate 3. The other end of the gyratory arm 4 has an abrupt emission seat 42 with an infrared emitting device 43 therein and the infrared emitting device 43 connects with the keyboard A via a signal wire passing the preceding wire passage 132.

Figure 4:
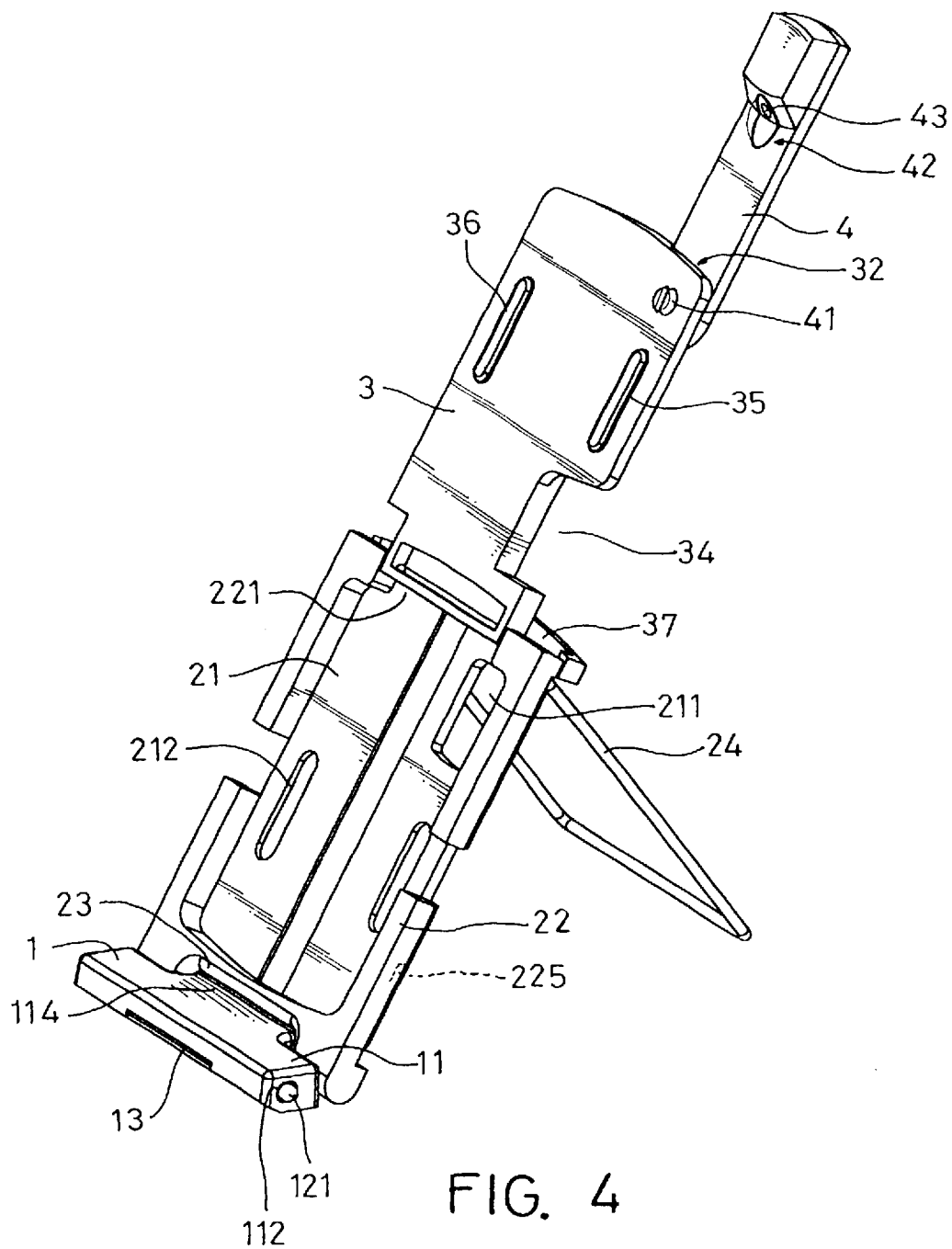
FIG. 4 is a perspective view of the stand shown in FIGS. 1 and 2.

FIG. 4 shows the stand with infrared emission of the present invention has been assembled already. While in use, the only thing has to be done is to place the PDA on the base 2 and the support plate 3 under a condition of the emission seat 42 aligning with the infrared receiver in the PDA. Meanwhile, the keyboard is operated to allow the signal passing through the signal lines such that the signal can be emitted by the infrared emitting device 43 and received by the receiver in the emission seat. In this way, the purpose for accurate emission and receiving can be achieved desirably.

Figure 5:
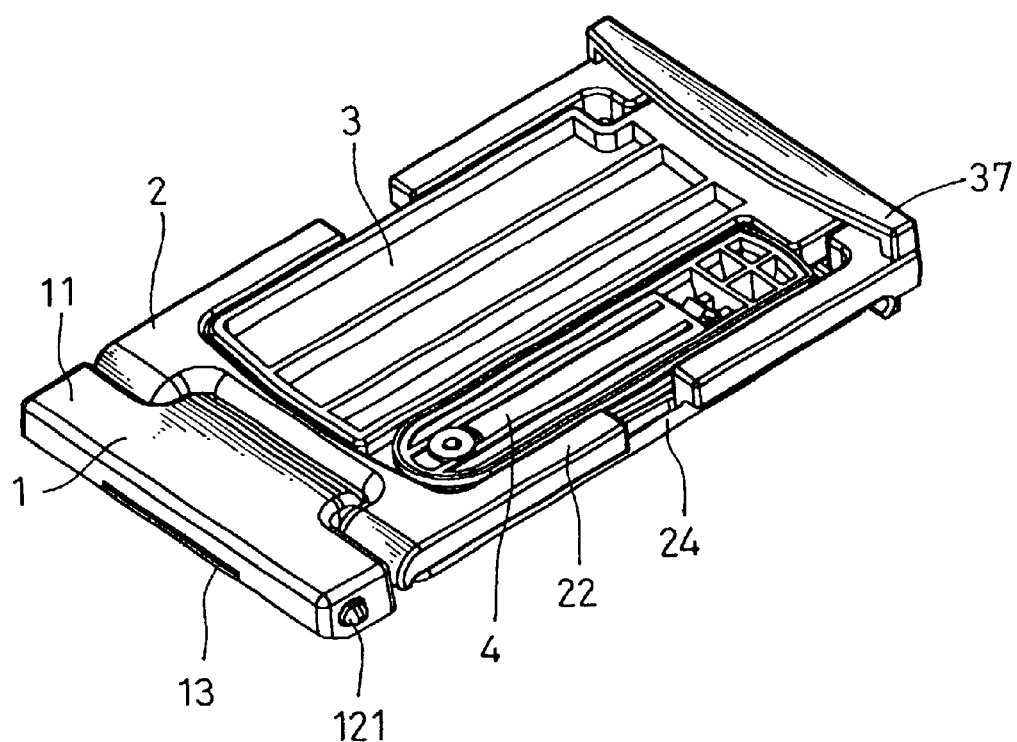

In case of taking in the stand of the present invention, referring to FIG. 5, first of all, the gyratory arm 4 is rotated toward the hollow-out 34 to locate the emission seat 42 in the hollow-out 34. Then, the support plate 3 is turned toward the base 2 and received in a space enclosed by the edge projections 22 on the base plate 21 such that the abrupt emission seat 42 can be disposed in the receiving hole 211 and the anti-slip pads 36 are received in the pad recesses 212 to allow the rear side of the support plate 3 keeping flush with the upper faces of the edge projections 22. At this moment, the U shaped frame 224 is received in the two frame grooves 223 and the base 2 is flattened with the pivot seat 1 for the entire stand being inserted into the keyboard.

It is appreciated that the stand with infrared emission of the present invention can be stretched or folded to meet the requirement of being operated flexibly due to it being possible to be turned and bent. Further, the emission seat in the present invention can obtain an optimum emitting angle via the gyratory being rotated adjustably to comply with different infrared receivers provided in different brands of PDA for performing more accurate key-in job. Meanwhile, the present invention makes the display screen of the PDA keep a best visional projection angle to fulfill the criteria of human engineering. Furthermore, the U shaped frame disposed under the base disclosed in the stand of the present invention being capable of regulating the angle of elevation of the entire stand is a pretty delicate design. Meanwhile, the stand of the present invention can be received in a keyboard completely after being turned and folded so as not to occupy the original space of the original keyboard. These advantages are unable to be reached by the conventional stand.

While the invention has been described with reference to the a preferred embodiment thereof, it is to be understood that modifications or variations may be easily made without departing from the spirit of this invention, which is defined by the appended claims.

What is claimed is:

1. A stand with infrared emission, which is connected to related circuit of a keyboard, comprising:
   a pivot seat with two ends, being a joining part, one of the ends thereof being connected to the keyboard and the other one of the ends having a first pivot device;
   a base with an upper end and a lower end, the lower end thereof connected to the pivot device;
   a support plate, having a lower side thereof integrally connecting with the upper end of the base and an upper side thereof being provided with a connection part; and
   a gyratory arm, a lower end thereof joining the connection part of the support plate, an upper end thereof being provided with an abrupt emission seat and an infrared emitting device being disposed in the emission seat and electrically connected to the keyboard;
   whereby, a personal digital assistant (PDA) can be placed on both the base and the support plate with the gyratory arm being adjustably rotated to align the emission seat with an infrared receiver so as to facilitate data transmission.

2. The stand with infrared emission as defined in claim 1, wherein the first pivot device has a respective pivot disposed at two lateral sides of a casing step in front of the pivot seat and the base at a lower side thereof has a locating recess 23 and two fitting holes for being inserted with and connecting with the pivots pivot device.

3. The stand with infrared emission as defined in claim 1, wherein a second pivot device is provided between the base and the support plate.

4. The stand with infrared emission as defined in claim 1, wherein the base at two lateral sides thereof pivotally connects with a U shaped frame and the U shaped frame can be turned outward to adjust an elevation angle of the base.

5. The stand with infrared emission as defined in claim 1, wherein each of the frame grooves has an engaging extension for engaging with the frame.

6. The stand with infrared emission as defined in claim 1, wherein the pivot device provides a locating hole at an upper end of the support plate and the gyratory arm at a lower end thereof has a protrusion to engage with the locating hole.

7. The stand with infrared emission as defined in claim 1, wherein the support plate at a lateral side thereof has a plate recess and at a lower portion thereof provides a hollow-out corresponding to the gyratory arm for receiving the emission seat after the gyratory arm being rotated.

8. The stand with infrared emission as defined in claim 1, wherein two opposite lateral elongated nests are provided at the support plate for joining two anti-slip pads.

9. The stand with infrared emission as defined in claim 1, wherein the gyratory arm is pivotally attached to the support plate and the support plate is lapped over the base such that the base can be taken in a track at a front side of the keyboard.

10. The stand with infrared emission as defined in claim 1, wherein a seat casing of the pivot seat at two lateral sides thereof extends a retractable shaft respectively so as to be associated with a track at a front side of the keyboard and form a stopper.

11. The stand with infrared emission as defined in claim 1, wherein the seat chamber is closed with a cover.

12. The stand with infrared emission as defined in claim 1, wherein the stand is disposed at an upper end of the keyboard.

13. The stand with infrared emission as defined in claim 3, wherein the second pivot device provides an abrupt edge projection respectively at two opposite lateral sides of a base plate in the base and a respective axle extends from the edge projections toward an opening between the edge projections; and the support plate at a lower end thereof is located at the opening with a respective joining hole disposed at two lateral walls thereof for pivotally joining the axles.

14. The stand with infrared emission as defined in claim 3, wherein the support plate at the lower end thereof has a baffle for pressing against a rear side of an upper end on the base plate.

15. The stand with infrared emission as defined in claim 4, wherein the two edge projections provide a lateral frame groove respectively for receiving the frame and provides two opposite upper pivot holes for pivotally connecting with two bent ends of the frame.

16. The stand with infrared emission as defined in claim 7, wherein the base plate at an upper portion thereof has a lateral receiving hole for receiving the emission seat.

17. The stand with infrared emission as defined in claim 8, wherein a pair of elongated recesses is provided at the base corresponding to the elongated nests at the time of the support plate being lapped for receiving the anti-slip pads.

18. The stand with infrared emission as defined in claim 10, wherein the seat casing at a bottom thereof has a seat chamber with two lateral casing holes and the retractable shafts extend downward next to a fitting head respectively; and the fitting head at an inner side thereof extends a locating jut for being mounted with a spring and being received in the seat chamber such that an end of the spring presses against a projecting stop rib for the retractable shafts extending outward through the casing holes.

19. The stand with infrared emission as defined in claim 11, wherein the cover is provided with a wire passage for the circuit passing through.

20. The stand with infrared emission as defined in claim 13, wherein an area enclosed by the edge projections is corresponding to a shape of the support plate for the support plate being turned over and folded within the edge projections and the support plate has the same thickness as the edge projections.

* * * * *